W. DE F. CROWELL.
BACK DRAFT SHIELD FOR VEHICLES.
APPLICATION FILED MAY 9, 1917.
1,275,400.
Patented Aug. 13, 1918.
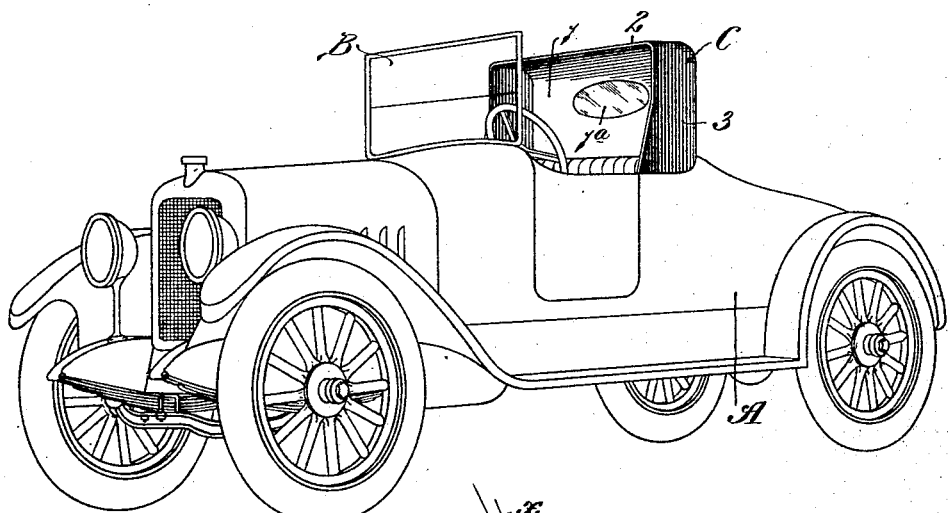
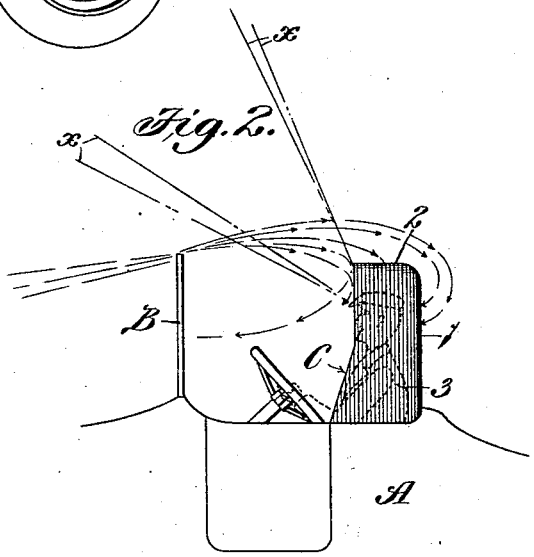
Inventor,
William de F. Crowell.
By Bakewell &c. Attys.

UNITED STATES PATENT OFFICE.

WILLIAM DE F. CROWELL, OF ST. LOUIS, MISSOURI.

BACK-DRAFT SHIELD FOR VEHICLES.

1,275,400.

Specification of Letters Patent.   Patented Aug. 13, 1918.

Application filed May 9, 1917. Serial No. 167,409.

*To all whom it may concern:*

Be it known that I, WILLIAM DE F. CROWELL, a citizen of the United States, residing at St. Louis, Missouri, have invented a certain new and useful Improvement in Back-Draft Shields for Vehicles, of which the following is a full, clear, and exact description, such as will enable others skilled in the art to which it appertains to make and use the same.

This invention relates to wind shields for automobiles, motor boats and other vehicles, and has for its main object to provide a back draft shield that will effectively protect the occupant or occupants of a vehicle or other conveyance from the back draft air currents that are produced by the front wind shield of the vehicle.

It is now the universal custom to mount a front wind shield on the cowl of an automobile body, so as to break the force of the wind against the occupants' faces and bodies when the automobile is traveling forwardly. While a front wind shield is very efficient for the particular purpose for which it was designed, it has the objectionable characteristic of producing a strong back draft, due to the vortex created at the rear side of the wind shield by the air which rushes rearwardly past the wind shield, which back draft causes air currents to be drawn inwardly and downwardly against the back of the head and neck of a person located behind the shield and frequently results in illness to the occupants of an automobile. In fact, these back draft air currents are so objectionable and injurious that many automobile drivers prefer to drive with the wind shield lowered, thus being subjected to the full force of the wind, rather than be subjected to the back draft produced by the vortex at the rear side of a raised wind shield. It has been attempted to overcome or reduce this objectionable back draft by sloping the wind shield rearwardly, so as to cause the air to travel over the upper edge of the wind shield at such an angle that it will not swirl downwardly and strike the back of the neck of a person located directly behind the wind shield, but experience has shown that a rearwardly inclined wind shield merely tends to reduce the downward air currents and fails absolutely to reduce the air currents that are drawn inwardly around the side edges of the shield. In touring cars, namely, automobiles provided with two seats, one of which is located some distance rearwardly from the wind shield, the occupants on the rear seat are subjected to a back draft produced by the air which is drawn inwardly at the rear of the automobile by the rapid forward motion of the automobile through space, said back draft usually causing the occupants of the rear seat to be covered with dust and dirt. If the automobile is equipped with a second wind shield mounted on the back of the front seat, the occupants of the rear seat are also subjected to the back draft produced by the vortex at the rear side of the second wind shield. The result is, that most people prefer to ride in a closed, or partly closed, automobile, thus foregoing the delights of riding in an open car, rather than be covered with dust or subjected to a draft on the back of the neck, which frequently results in illness.

As previously stated, the main object of my invention is to provide a wind shield that will protect the occupants of an automobile, motor boat or other vehicle from back drafts of the character referred to, and to this end I have devised a wind shield, which, briefly stated, consists of an upright wall arranged at the rear of the occupant or occupants to be protected from the back draft and provided at its upper edge and side edges with forwardly-projecting flanges or portions which prevent any air currents that flow inwardly and downwardly toward said occupant from striking the back of the head or neck of said occupant, said wall being disposed vertically, or substantially so, and said forwardly-projecting flanges being so proportioned that they will not obstruct the view of the occupant either upwardly or sidewise. The device is preferably mounted on the upper edge of the back of the seat that holds the person to be protected, and said device can be constructed in various ways without departing from the spirit of my invention. It may be rigid and immovably mounted in position, or it may be constructed in such a manner that it can be collapsed and arranged in an inoperative position. It may be formed of sheet metal, glass or other rigid material, or it may be formed of fabric or other suitable flexible material. The particular shape of the device is also immaterial, so long as it is of such form that it will effectively protect the person located in front of same from the back drafts produced by the front wind shield without obstructing said person's view upwardly or sidewise.

Figure 1 of the drawings is a perspective view, illustrating an automobile of the roadster type equipped with a back draft wind shield constructed in accordance with my invention; and Fig. 2 is a side elevational view, illustrating how said wind shield acts when it is in use.

Referring to the drawings which illustrate one form of my invention used on an automobile of the roadster type, A designates the body of the automobile, B designates the usual front wind shield and C designates my back draft shield. The shield C is preferably mounted on the upper edge of the back of the seat of the automobile, and it comprises a wall 1 arranged in a vertical, or substantially vertical position, a top flange or portion 2 that projects forwardly from the upper edge of said wall in a horizontal, or substantially horizontal, plane, and side flanges or portions 3 that project forwardly from the wall 1, thus forming a housing whose front side is open and whose top, back and ends are closed. The front edges of the top wall portion 2 and the side wall portions 3 preferably terminate at such a point that they will not obstruct the occupant's view either upwardly or sidewise, as indicated by the dot and dash lines $x$ in Fig. 2. In practice I prefer to so proportion the shield that the front edge of the top wall portion and the front edges of, at least, the upper parts of the side wall portions of same, will terminate on a line substantially flush with the occupant's face, but this is a detail that can be varied without departing from the spirit of my invention. The wall 1, is preferably provided with one or more sight openings that are covered with transparent material 1ª, as shown in Fig. 1, so as to enable the occupant to look rearwardly through said wall.

When the automobile, boat or other vehicle on which the shield is used is in motion the currents of air that travel over the upper edge and around the side edges of the front wind shield B, as indicated by the arrows in Fig. 2, are prevented from striking against the back of the head or the neck of a person located behind said front wind shield by the vertical wall 1, the top wall 2 and the side walls 3 of my improved back draft shield C. The pocket of air that is trapped in said shield C also tends to deflect or shunt off the currents of air that try to strike the occupant, thus preventing air currents from entering the shield C and circulating around the occupant of same. I, of course, do not claim that my improved shield C eliminates, or even tends to reduce the vortex at the rear side of the front wind shield B, but what I do claim is, that my improved shield effectively protects the occupants from the back draft currents of air that are produced by said vortex. If desired, the lower portions of the side walls 3 of the shield can be made slightly deeper than the upper portions of said walls, so as to improve the appearance of the device and also provide a relatively wide base portion that can be securely connected to the back of the seat on which the shield C is mounted.

My improved shield is adapted for use on any vehicle, boat or passenger conveyance wherein the occupants or passengers are subjected to a back draft produced by any cause, and while I have illustrated it used in connection with an automobile provided with a roadster type body, I wish it to be understood that it is adapted for use with an automobile provided with a touring body. In a touring type body it is preferable to equip both seats with my improved shield C, so as to protect the occupants of the front seat from the back draft produced by the vortex at the rear side of the front wind shield and protect the occupants of the rear seat from the back draft and dust produced by the air which is drawn inwardly at the rear of the automobile when it is in motion.

From the foregoing it will be seen that my improved back draft shield C enables a person to enjoy the delights of an open motor car without being subjected to any of the discomforts incident to riding in an open motor car equipped with merely a front wind shield such as is now universally used on motor cars, said shield C being so constructed that the occupants are completely protected from back drafts without obstructing the view of the occupants either upwardly or sidewise.

Having thus described my invention, what I claim, and desire to secure by Letters Patent, is:

1. The combination of a wind shield, a seat and a draft shield having a back wall, relatively narrow side walls and a relatively narrow top portion, whereby the occupant of the seat is protected from the back draft produced by the wind shield without materially cutting off the view of the occupant of the seat upward or sidewise.

2. In an automobile, motor boat or other conveyance, the combination of a seat, a front wind shield arranged in front of said seat, and a draft shield arranged at the rear of said seat adjacent the upper edge of the back of the seat and comprising a back wall, relatively narrow side walls and a relatively narrow top portion whereby the occupant of the seat is protected from the back draft currents produced by the vortex created at the rear side of the wind shield without materially cutting off the view of said occupant upward or sidewise.

3. In an automobile, motor boat or other conveyance, the combination of a seat, a front wind shield, and a back draft shield arranged at the rear of the seat, said back draft shield consisting of a housing open at its front side and provided at its top and sides with forwardly-projecting portions which are relatively narrow so that the front edges of same will terminate on a line substantially flush with the face of the occupant of said seat and thus protect said occupant from the back draft produced by the front wind shield without materially cutting off the view of said occupant upward or sidewise.

4. In an automobile, motor boat or other conveyance, the combination of a seat, a wind shield arranged in front of said seat, and a back draft shield arranged at the rear of said seat and provided with a vertical, or substantially vertically-disposed wall, and portions that project forwardly from said wall above and at the sides of the occupant of said seat, for the purpose described, the front edges of said forwardly-projecting portions terminating at a point far enough to the rear of said front wind shield so that they will not obstruct the upward and sidewise view of the occupant of said seat.

WILLIAM DE F. CROWELL.

Copies of this patent may be obtained for five cents each, by addressing the "Commissioner of Patents, Washington, D. C."